June 26, 1956  L. C. MILLER  2,751,940
FLUID PRESSURE POWER-OPERATED RECIPROCATING SHAFT TOOL
Filed Feb. 23, 1952  3 Sheets-Sheet 1
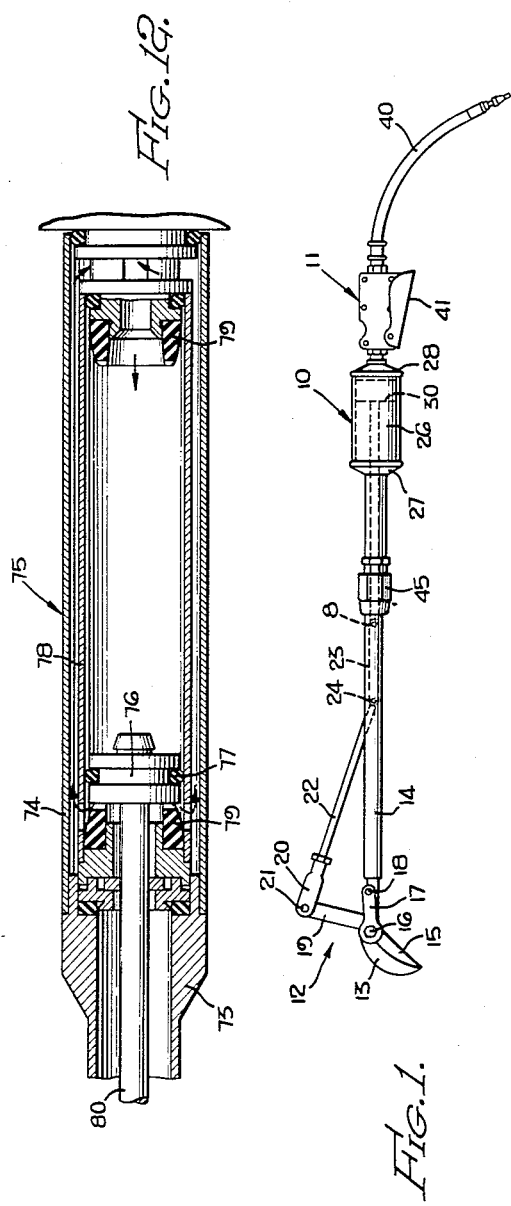
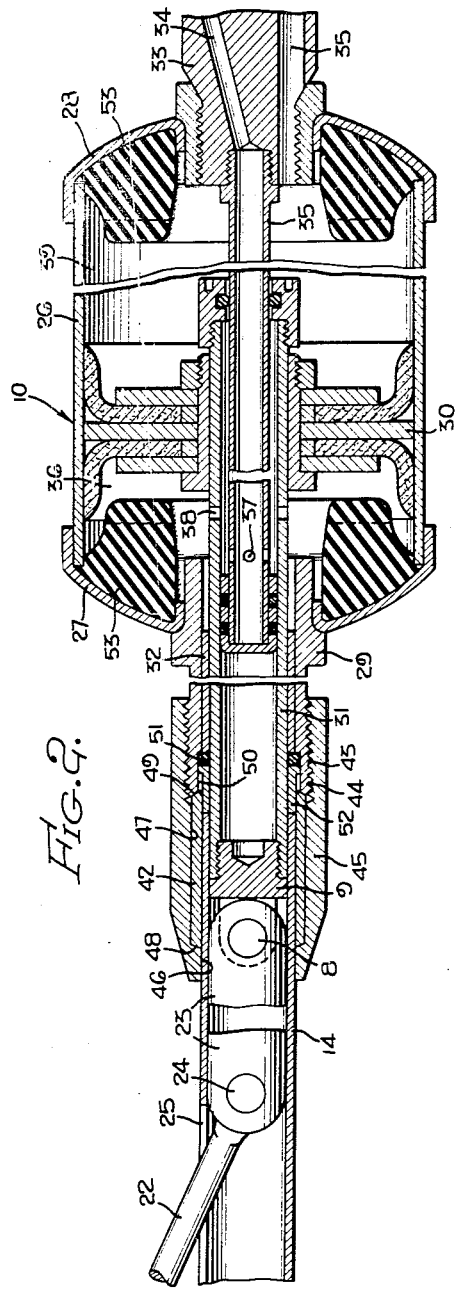
LEONIDAS C. MILLER,
INVENTOR.
BY  *Lyon & Lyon*
ATTORNEYS

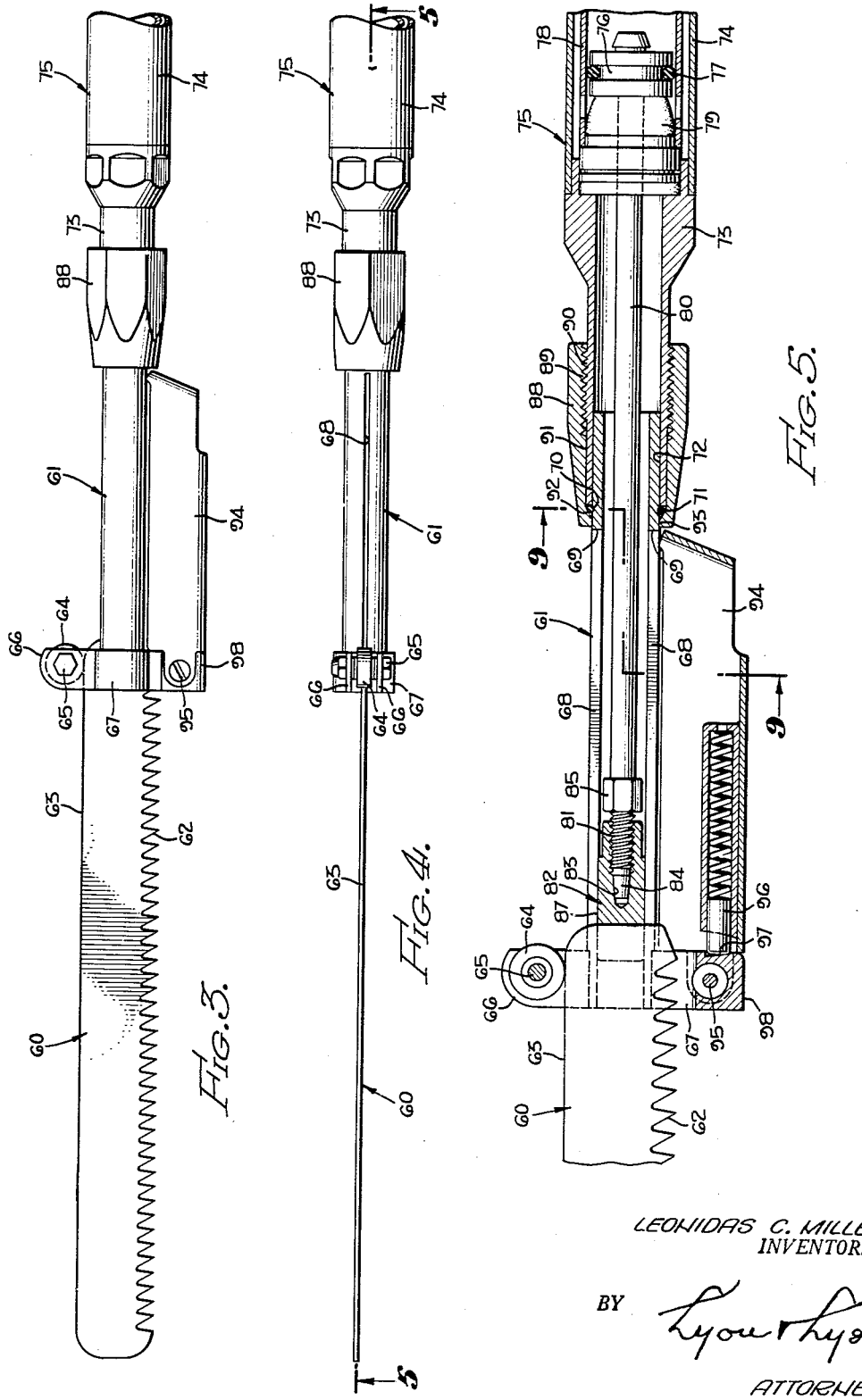

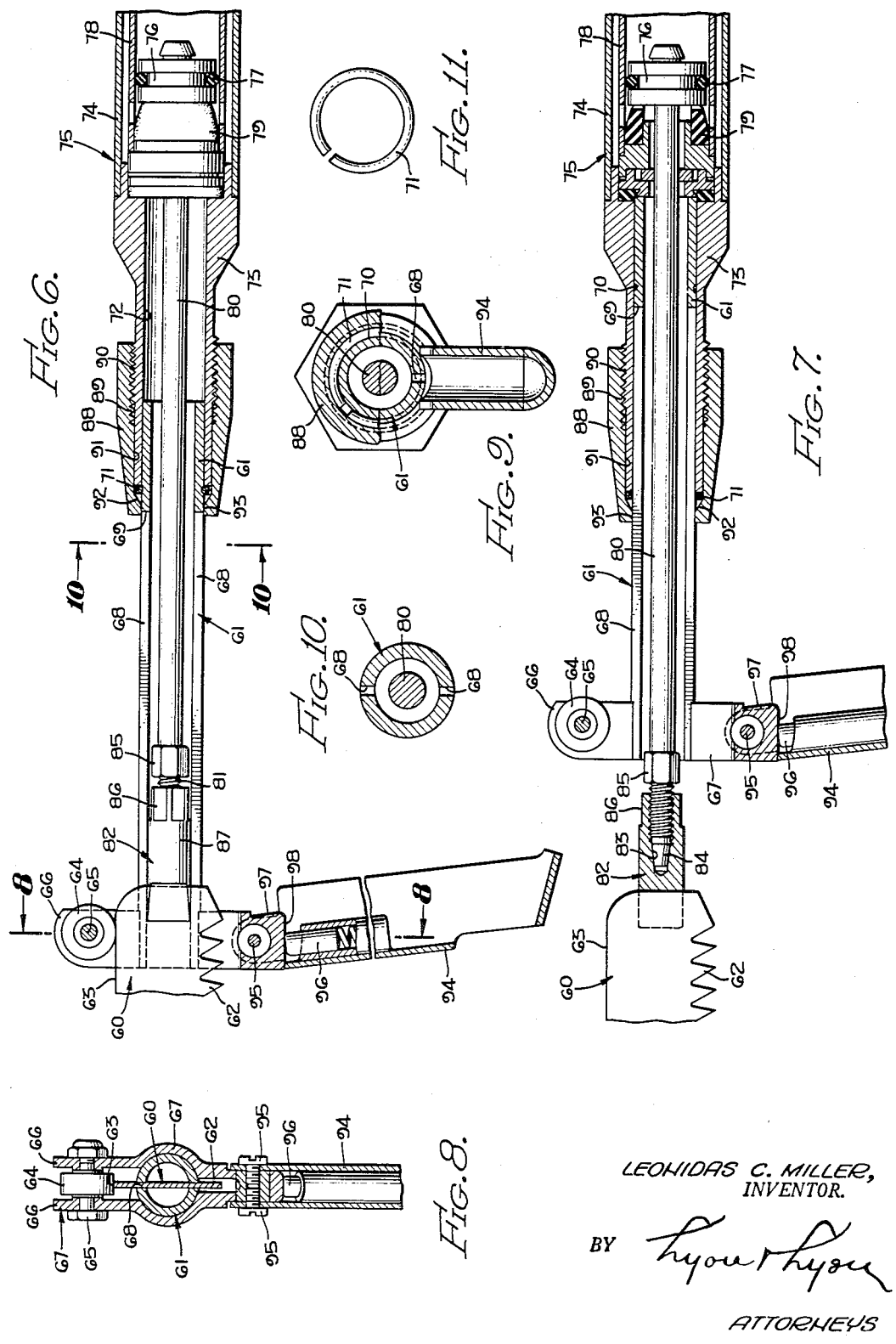

United States Patent Office 2,751,940
Patented June 26, 1956

2,751,940

FLUID PRESSURE POWER-OPERATED
RECIPROCATING SHAFT TOOL

Leonidas C. Miller, Los Angeles, Calif.

Application February 23, 1952, Serial No. 273,058

3 Claims. (Cl. 143—68)

This invention relates to portable power operated tools and is particularly directed to improvements in mounting and connecting the work-performing element relative to a fluid actuated power cylinder assembly. This application is a continuation-in-part of my copending application, Serial No. 667,320, filed May 4, 1946, and entitled "Fluid Driven Actuator for a Tool," Patent No. 2,612,140, granted September 30, 1952.

An important object of this invention is to provide an improved form of connection between a work-performing element of a tool and a power cylinder assembly having a reciprocable piston rod.

Another object is to provide a device of this type which permits angular adjustment of the work-performing element with respect to the power cylinder assembly.

Another object is to provide such a device which enables different types of work-performing elements to be connected for operation by the same power cylinder assembly.

Another object is to provide a mounting support having telescoping parts to provide access to a normally enclosed connection between the piston rod and the work-performing element of the tool.

Other and more detailed objects and advantages will appear hereinafter.

In the drawings:

Figure 1 is a side elevation of a portable power operated tool embodying my invention.

Figure 2 is a longitudinal sectional view on an enlarged scale of a portion of the device shown in Figure 1.

Figure 3 is a side elevation partly broken away showing a modified form of my invention.

Figure 4 is a plan view of the device shown in Figure 3.

Figure 5 is a sectional elevation taken substantially on the line 5—5 as shown in Figure 4.

Figure 6 is a view similar to Figure 5 showing the nut in partly disengaged position and the guard swung to its extended position.

Figure 7 is a view similar to Figure 6 showing the tubular support in retracted position to expose the threaded connection between the piston rod and work-performing element of the tool.

Figure 8 is a transverse sectional view taken substantially on the line 8—8 as shown in Figure 6.

Figure 9 is a transverse sectional view taken substantially on the line 9—9 as shown in Figure 5.

Figure 10 is a transverse sectional view taken substantially on the line 10—10 as shown in Figure 6.

Figure 11 is an end elevation of the split ring.

Figure 12 (Sheet 1) is a sectional view of a power cylinder assembly used in connection with my invention.

Referring to the drawings, the fluid driven actuator assembler 10 is operatively positioned between a valve assembly 11 and a pruning shear assembly generally designated 12. The pruning shear assembly 12 preferably comprises a stationary blade 13 secured to the end of a slotted tubular support 14. A movable blade 15 is pivotally connected to the stationary blade by means of a pivot bolt 16. Means are provided for preventing turning movement of the bolt 16 under the influence of the moving blade 15, and as shown in Figure 1 this means may include a small box wrench 17 having its outer end secured to the stationary blade by means of a fastener element 18. A crank arm 19 formed integrally with the movable blade 15 is pivotally connected to a clevis 20 by means of a pin 21. An actuating arm 22 is threadedly connected with the clevis 20 at one end and at the other end is pivotally connected to a link 23 by a pivot pin 24. The actuating arm 22 extends through an axial slot 25 (Fig. 2) formed in the wall of the tubular support 14. The link 23 is preferably circular in cross-section and is slidably received within the bore of the tubular member 14. The link 23 is pivotally connected by pin 8 to the end fitting 9 secured to the projecting end of the piston rod 31.

The actuator or power cylinder assembly 10 may be of any desirable construction, and as shown in Figure 2 includes a cylinder or housing 26 having end walls 27 and 28. A stationary sleeve 29 forming a part of the housing is fixed to the end wall 27 and projects axially from the cylinder 26. A piston 30 is mounted to reciprocate within the cylinder 26 and the piston 30 is fixed to a hollow piston rod 31 which projects axially through the sleeve 29. A bearing 32 is provided for guiding the piston rod 31 within the stationary sleeve 29.

A terminal connection fitting 33 is provided with a first passage 34 which communicates with a spear tube 35 extending axially into the bore of the hollow piston rod 31. This spear tube 35 is closed at its outer end and communicates with the space 36 through ports 37 and 38. The terminal connection fitting 33 is provided with a second passage 34a which connects with the space 39. Air supplied under pressure through hose 40 is directed by the control valve assembly 11 through one of the passages 34 or 35 and is exhausted through the other passage. Operation of the pivoted lever 41 (Fig. 1) on the valve assembly 11 thus causes the piston 30 to move in the cylinder 26. Resilient bumpers 53 may be provided on the end walls 27 and 28 to cushion the action of the piston 30 at each end of its stroke.

In accordance with my invention I provide a novel form of connection for securing the tubular support 14 to the stationary housing sleeve 29. A ring or collar 42 is fixed to the tubular support 14 near one end thereof and constitutes an enlargement of the tubular support. External threads 43 are provided on the sleeve 29, and these threads are engaged by the internal threads 44 of the nut 45. The nut 45 is provided with a bore 46 slidably receiving the tubular support 14 and is also provided with a counterbore 47 to receive the ring or collar 42. The counterbore 47 terminates in a shoulder 48.

When the nut 45 is threaded on the sleeve 29 the shoulder 48 engages one end of the ring or collar 42 and clamps the other end against the end surface 49 of the stationary sleeve 29. The nut 45 therefore serves to connect the sleeve 29 and tubular support 14 in operative position. Loosening of the nut permits the tubular support 14 to be turned with respect to the sleeve 29 so that the shear assembly 12 may be oriented as desired with respect to the power cylinder assembly 10 and control valve 11. Thus, the plane of action of the shear blade 15 may be turned with respect to the plane of operation of the lever 41.

The sleeve 29 may be provided with a counterbore 50 to receive a seal ring 51 which engages the outer surface of the piston rod 31. A spacer 52 may be provided to hold the seal ring 51 in proper position.

In that form of my invention shown in Figures 3–11 a saw blade 60 is mounted for reciprocation relative to the slotted tubular support 61. One edge of the saw blade 60 is provided with the usual teeth 62 and the other edge 63 is engaged by a back-up roller 64. This roller 64 is mounted to turn on a stationary pin 65 extending between upstanding portions 66 of the crosshead 67. The crosshead 67 is fixed to the forward end of the tubular support 61. Axially extending diametrically positioned slots 68 are provided in the tubular support 61 to receive the saw blade 60. The slots 68 extend to the forward end of the tubular support 61 and terminate at shoulders 69 near the other end of the tubular support 61.

The tubular support 61 is telescopically received within the bore 72 of the stationary sleeve 73. This sleeve 73 constitutes a forward extension of the cylinder 74 of the pneumatic actuator generally designated 75. A piston 76 carrying a seal ring 77 is mounted to reciprocate within the inner cylinder 78 of the assembly 75. Rubber bumpers 79 (Fig. 12) may be mounted at the ends of the inner cylinder 78 to cushion the action of the piston at the ends of its stroke. A piston rod 80 is fixed to the piston 76 and extends forward through the interior of the sleeve 73 and into the interior of the tubular support 61. A control valve assembly (not shown) is provided for introducing air under pressure alternately into opposite ends of the inner cylinder 78 to reciprocate the piston 76 within the inner cylinder 78.

Means are provided for connecting the saw blade 60 to the projecting end of the piston rod 80, and as shown in the drawings this means includes a threaded portion 81 on the piston rod which is received within a threaded fitting 82 attached to the saw blade. The fitting 82 may be secured to the saw blade 60 by any convenient means such as, for example, by brazing or welding. A tapered socket 83 in the fitting 82 may be provided to receive a tapered pilot 84 provided on the piston rod. An enlarged portion 85 may be integrally formed on the piston rod 80 and provided with wrench flats. Similar wrench flats 86 may be provided on the fitting 82. The central portion 87 of the fitting 82 preferably forms a sliding fit within the interior of the tubular support 61. From this description it will be understood that reciprocation of the piston rod 80 causes the saw blade 60 to reciprocate in the slots 68.

The annular groove 70 is provided on the outer surface of the tubular support 61, and a split ring 71 is mounted in the groove. A nut 88 has internal threads 89 which are engageable with the external threads 90 provided on the stationary sleeve 73. The nut is also provided with a counterbore 91 which receives the forward end of the sleeve 73 and also loosely receives the split ring 71. The counterbore 91 terminates in a taper shoulder 92. The bore 93 slidably receives the outer surface of the tubular support 61. When the nut is in the position shown in Figure 5 the split ring 71 is confined radially by the taper shoulder 92 against displacement from the groove 70. The shoulder 92 also serves to clamp the split ring 71 against the end of the sleeve 73. This provides a rigid connection between the sleeve 73 and the tubular support 61. Upon loosening of the nut 88 the tubular support and saw blade 60 may be angularly adjusted to any desired position. Thus, the plane of action of the saw blade 60 may be turned with respect to the plane of operation of the lever 41. Upon retightening of the nut 88 the parts are held in the desired angular relationship.

Means are provided to facilitate installation and removal of the saw blade 60, and as shown in the drawings this means includes a guard 94 which is pivotally mounted on the crosshead 67 by means of the aligned pins 95. A spring urged pin 96 mounted on the guard 94 engages the surface 97 on the crosshead 67 to hold the guard in operative position. The pin 96 also acts against the surface 98 when the guard is extended to hold it in extended position. When the guard 94 is moved to its extended position as shown in Figures 6 and 7 it provides a manually graspable handle. Upon loosening of the nut approximately one-half revolution to the position shown in Figure 6 the guard 94 may be used as a handle to move the tubular support telescopically into the interior of the sleeve 73. When the split ring 71 contacts the end of the sleeve 73 it expands sufficiently within the counterbore 91 to move out of the groove 70 and allow the tubular support 61 to move to the right as viewed in Figure 6 to the retracted position shown in Figure 7. When the tubular support 61 is thus telescoped within the sleeve 73 the forward end of the piston rod is exposed so that wrenches can be applied to the parts 85 and 86 to separate the saw blade 60 from the piston rod 80. A new saw blade may be threaded onto the projecting end of the piston rod as thus exposed. The guard 94 may again be used as a handle to withdraw the tubular support from within the sleeve 73. The nut 88 is then threaded into place, thus completing the assembly of parts. The guard 94 may then be returned to its operative position as shown in Figures 1 and 5.

Having fully described my invention, it is to be understood that I do not wish to be limited to the details herein set forth, but my invention is of the full scope of the appended claims.

I claim:

1. In a portable power operated tool, the combination of: a fluid operated power cylinder assembly having a stationary housing and a reciprocable piston rod extending axially through one end of the housing, a valve assembly fixed relative to the housing at the other end thereof for controlling operation of the piston rod, a lever on the valve assembly for operating the valve assembly, and movable in a certain plane, a tubular support having a central opening receiving a portion of said piston rod, a movable work element supported upon the tubular support and operatively connected for activation by the piston rod, said work element having a plane of action, a ring encircling a portion of the tubular support and constituting an enlargement thereof, a nut threaded on the housing, the nut having a bore slidably receiving the tubular support and also having a counterbore to receive said ring, the nut acting to clamp the ring axially against the housing to prevent relative turning movement therebetween, loosening of the nut acting to permit such relative turning movement to enable the plane of action of the work element to be turned with respect to the plane of movement of said lever.

2. The combination set forth in claim 1 in which the work element comprises an oscillating cutting blade.

3. The combination set forth in claim 1 in which the work element comprises a reciprocating saw blade.

References Cited in the file of this patent

UNITED STATES PATENTS

| 15,163 | Arnold | June 24, 1856 |
| --- | --- | --- |
| 1,059,400 | Seberg | Apr. 22, 1913 |
| 1,069,146 | Kennedy | Aug. 5, 1913 |
| 1,528,731 | Barker | Mar. 3, 1925 |
| 1,779,857 | Shafer | Oct. 28, 1930 |
| 2,519,214 | Angelotti | Aug. 15, 1950 |
| 2,538,456 | Howe | Jan. 16, 1951 |
| 2,557,495 | Bily | June 19, 1951 |